(12) United States Patent
Patoux et al.

(10) Patent No.: US 9,276,245 B2
(45) Date of Patent: Mar. 1, 2016

(54) METHOD OF FORMING A FILM MADE OF A FLUOROPOLYMER OF THE POLYVINYLIDENE FLUORIDE TYPE THAT CAN BE USED AS A SEPARATOR FOR A LITHIUM BATTERY

(75) Inventors: Sébastien Patoux, Fontaine (FR); Fannie Alloin, Vizille (FR); Lise Daniel, Saint Marcellin (FR)

(73) Assignees: COMMISSARIAT À L'ENERGIE ATOMIQUE ET AUX ENERGIES ALTERNATIVES, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 42 days.

(21) Appl. No.: 13/638,405

(22) PCT Filed: Mar. 22, 2011

(86) PCT No.: PCT/FR2011/000161
§ 371 (c)(1),
(2), (4) Date: Sep. 28, 2012

(87) PCT Pub. No.: WO2011/121190
PCT Pub. Date: Oct. 6, 2011

(65) Prior Publication Data
US 2013/0034778 A1 Feb. 7, 2013

(30) Foreign Application Priority Data
Apr. 1, 2010 (FR) .................................. 10 01366

(51) Int. Cl.
*H01M 2/16* (2006.01)
*B01D 67/00* (2006.01)
(Continued)

(52) U.S. Cl.
CPC ......... *H01M 2/1653* (2013.01); *B01D 67/0013* (2013.01); *B01D 71/34* (2013.01);
(Continued)

(58) Field of Classification Search
USPC ............................................. 429/249; 521/27
See application file for complete search history.

(56) References Cited

U.S. PATENT DOCUMENTS 6,652,751 B1 * 11/2003 Kutowy et al. .......... 210/500.27
7,678,277 B2 * 3/2010 Kloos et al. .................... 210/651
(Continued)

FOREIGN PATENT DOCUMENTS

FR          2857670 A1 *  1/2005
JP       H-04-239041    *  8/1992
(Continued)

OTHER PUBLICATIONS

International Search Report issued in International Application No. PCT/FR2011/000161 dated Jun. 8, 2011 (with translation).
(Continued)

*Primary Examiner* — Peter D Mulcahy
*Assistant Examiner* — Henry Hu
(74) *Attorney, Agent, or Firm* — Oliff PLC

(57) ABSTRACT

A film made of a fluorinated polymer of the polyvinylidene fluoride type having suitable properties for use as a lithium storage battery separator is produced using a phase inversion technique in which a solution containing the fluorinated polymer is brought into the presence of an atmosphere laden with water vapor to precipitate the fluorinated polymer. The fluorinated polymer can be precipitated by placing the support on which the solution is deposited, in which the fluorinated polymer has been previously dissolved, in an enclosure containing an atmosphere laden with water vapor and thermostatically regulated to a temperature comprised between 30° C. and 70° C. The relative humidity content during precipitation of the fluorinated polymer is advantageously between about 60% and about 98%.

17 Claims, 2 Drawing Sheets

(51) Int. Cl.
  *B01D 71/34* (2006.01)
  *H01M 2/14* (2006.01)
  *H01M 10/052* (2010.01)

(52) U.S. Cl.
  CPC ........... *H01M 2/145* (2013.01); *H01M 2/1673* (2013.01); *H01M 10/052* (2013.01); *B01D 2323/00* (2013.01); *B01D 2323/08* (2013.01); *Y02E 60/122* (2013.01)

(56) References Cited

U.S. PATENT DOCUMENTS

| | | | |
|---|---|---|---|
| 7,998,524 B2* | 8/2011 | Wang et al. | 427/2.24 |
| 8,486,482 B2* | 7/2013 | Wang et al. | 427/2.1 |
| 2006/0118482 A1* | 6/2006 | Kloos et al. | 210/500.21 |
| 2007/0151511 A1* | 7/2007 | Northrup | B05C 11/041 118/100 |
| 2009/0148591 A1* | 6/2009 | Wang et al. | 427/2.25 |
| 2009/0165707 A1* | 7/2009 | Lee et al. | 118/108 |

FOREIGN PATENT DOCUMENTS

| | | | |
|---|---|---|---|
| JP | H-04-239041 A | | 8/1992 |
| JP | 2007-004146 | * | 1/2007 |
| JP | 2007-004146 A | | 1/2007 |
| JP | 2008-501218 | * | 1/2008 |
| JP | 2008-501218 A | | 1/2008 |
| WO | WO-2005/119816 A1 | * | 12/2005 |

OTHER PUBLICATIONS

Translation of Jan. 16, 2015 Office Action issued in Japanese Application No. 2013-501884.

* cited by examiner

METHOD OF FORMING A FILM MADE OF A FLUOROPOLYMER OF THE POLYVINYLIDENE FLUORIDE TYPE THAT CAN BE USED AS A SEPARATOR FOR A LITHIUM BATTERY

BACKGROUND OF THE INVENTION

The invention relates to a method of forming a film made of a fluoropolymer of the polyvinylidene fluoride type, comprising the following steps:
deposition on a support of a solution containing a solvent in which the fluorinated polymer is dissolved and
precipitation of the fluorinated polymer by phase inversion with water.

STATE OF THE ART

In order to cope with the increasing demand for energy storage needs, lithium storage batteries, such as Li-Ion storage batteries, have become an absolute must. This technology can in fact be well suited for different applications, depending in particular on a large choice of active materials for the positive and negative electrodes and of electrolyte.

In the case of liquid electrolyte (salt and solvents), the choice of separator element designed to separate the positive and negative electrodes and to be imbibed with liquid electrolyte is also determinant. For example purposes, the article "A review on the separators of liquid electrolyte Li-Ion batteries" by Sheng Shui Zhang (Journal of Power Sources 164 (2007) 351-364) reviews the different categories of separators used in these Li-Ion batteries with a liquid electrolyte, as well as the required qualities.

Among these different categories, the most common is that formed by porous polymer membranes designed to receive an advantageously non-aqueous, liquid electrolyte.

These membranes are, in common manner, formed from materials made from the polyolefin family, including polypropylene (PP), polyethylene (PE) or a mixture of the two (PE-PP). The most commonly used separator elements are those marketed by the Celgard corporation, such as the range of single-layer PP separators Celgard®, the range of single-layer PE separators Celgard® and the range of three-layer PP/PE/PP separators Celgard®. Such separator elements were privileged in particular, as their small thickness enables the distance between the positive and negative electrodes to be limited thereby compensating the relative poor conductivity of the Li$^+$ ions or of the organic solvent(s) used for the liquid electrolyte, in comparison with aqueous electrolytes. These separator elements further present a sufficient tortuosity and porosity to prevent short-circuiting of the electrodes, via formation of dendrites at the negative electrode, when the latter is made from graphite carbon.

In alternative manner, it has also been proposed to use a fluorinated polymer of polyvinylidene fluoride (PVdF) type to produce porous polymer membranes forming the separators of the lithium storage batteries.

U.S. Pat. No. 5,296,318 for example highlights the interest of separator films formed by polymers obtained by copolymerization of vinylidene fluoride (VdF) with about 8% to 25% of hexafluoride propylene (HFP).

Patent application WO-A-2005/119816 also proposes a separator for a lithium storage battery of polyvinylidene fluoride type and more particularly a PVdF/HFP copolymer. In particular, it has been found that a lithium storage battery with a PVdF/HFP membrane with a thickness comprised between 60 and 120 μm and with a porosity comprised between 50% and 90% as separator element would enable a good power operation to be obtained, i.e. with a fast charge and discharge. PVdF does in fact present a good affinity with the liquid electrolytes commonly used in lithium storage batteries, and in particular with solvents of alkyl carbonate type used to dissolve lithium salts. This good affinity results in a lower conductivity drop when the PVdF-base membrane is inserted in the storage battery, in comparison with that observed with separators with a polyolefin type matrix. The structure of such a membrane, in the form of a gel, further ensures an enhanced cohesion between the electrodes compared with a separator of polyolefin type, and is also liable to limit the risks of electrolyte leakage and enables storage batteries of flexible architecture to be produced.

In patent application WO-A-2005/119816, the PVdF/HFP membrane can be produced by a phase inversion technique by immersion. This technique comprises solubilization of the polymer in a solvent, such as N-methyl pyrrolidone (NMP), followed by deposition of the solution on a rigid support and immersion of the support in a non-solvent, i.e. a solution miscible with the solvent but in which the polymer does not dissolve, such as ethanol. Such an immersion causes precipitation of the polymer by phase inversion, and the support is then placed in an oven for drying. Such a fabrication method enables membranes to be obtained with characteristics suitable for the lithium storage battery application, but it requires a very large volume of organic solvents. In order to obtain rapid precipitation of the polymer, there does in fact have to be a large excess of non-solvent with respect to the polymer solution. This method therefore involves a large volume of a mixture of solvents, which subsequently has to be treated, giving rise to a high method cost and to recycling problems.

In the article "Fine structure of Poly(vinylidene fluoride) membranes prepared by phase inversion from a water/N-Methyl-2-pyrollidone/Poly(vinylidene fluoride) system" by D-J. Lin et al. (J. Power Sci., Part B, Polym. Phys., 42 (2004) 830-842), it has been proposed to produce PVdF membranes by phase inversion by immersion, from a N-methyl-2-pyrrolidone (NMP) solution in which the PVdF is dissolved and in a non-solvent formed by pure water or by a mixture of water and NMP. However, the use of water as non-solvent does not enable to obtain a membrane usable as separator for a lithium storage battery. The polymer in fact precipitates too quickly. The membrane obtained then presents a skin and pores having a mean size that is too large for the membrane to be able to be used as separator for a lithium storage battery.

OBJECT OF THE INVENTION

The object of the invention is to propose a method of forming a film made of a fluorinated polymer of the polyvinylidene fluoride type that is inexpensive, non-pollutant and, more particularly, the object of the invention is to obtain a film that can be used as separator element for a lithium battery.

According to the invention, this object is achieved by the appended claims. This object is more particularly achieved by the fact that the fluorinated polymer film of the polyvinylidene fluoride type is formed by:
deposition on a support of a solution containing a solvent in which the fluorinated polymer is dissolved and
precipitation of the fluorinated polymer by phase inversion with water, said precipitation of the polymer being obtained by placing said solution in the presence of an atmosphere laden with water vapor,
without immersion in a liquid non-solvent and in particular in liquid water.

In a preferred embodiment, the precipitation step of the fluorinated polymer is performed at a temperature comprised between 30° C. and 70° C., with a solvent chosen from among acetone and/or butanone, a mass proportion of fluorinated polymer in the solution, advantageously, comprised between 11% and 20% and even more advantageously between 13% and 17%, and a relative humidity content during precipitation of the fluorinated polymer that is advantageously comprised between 60% and 98% and even more advantageously between 85% and 98%.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
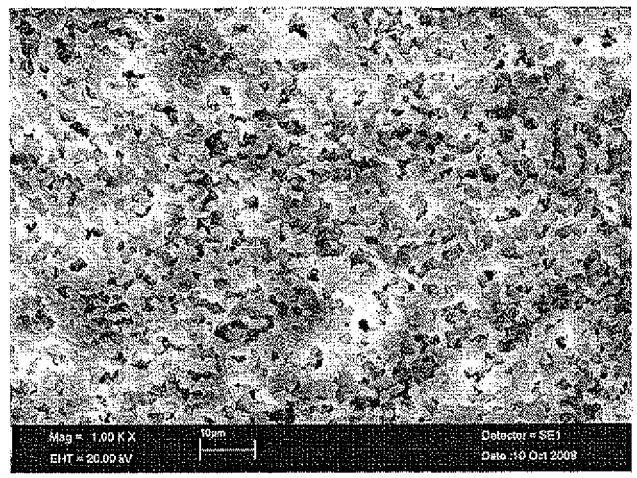
FIGS. 1 to 3 represent scanning electron microscopy snapshots of a PVdF film formed by a method according to the invention, respectively in front view, rear view and cross-section.

It has been found, in surprising and unexpected manner, that a film (also able to be called "membrane") made from fluorinated polymer of the polyvinylidene fluoride type can present suitable properties for use as separator of a lithium storage battery, by using a phase inversion technique with water as formation method. Within the scope of the invention, precipitation of the fluorinated polymer initially dissolved in a solution containing a solvent is obtained by placing said solution in the presence of an atmosphere laden with water vapor, excluding any immersion in a liquid non-solvent such as water. The water is thus in gaseous form when it is, at least initially, brought into the presence of said solution. Thus, contrary to the prior art, within the scope of the invention, there is therefore no phase inversion by immersion in a non-liquid solvent, whether it is before or after the solution has been placed in the presence of an atmosphere laden with water vapor.

Thus, in a first step, the fluorinated polymer chosen to form a separator for a lithium storage battery, in the form of a porous self-supported film, is dissolved in a solvent. The solvent is more particularly chosen from acetone, butanone, tetrahydrofuran, cyclopentanone, γ-butyrolactone, dimethysulfoxide and N-methylpyrrolidone and a mixture of the latter. The solvent is preferably chosen from acetone, butanone and a mixture of acetone and butanone. The choice of these solvents is in fact preferred, as these solvents are volatile, which facilitates their elimination after the precipitation operation, and they enhance the formation of a film presenting small pore sizes (advantageously between 0.5 and 4 microns). This is particularly interesting in the field of application of lithium storage batteries.

The mass proportion of the fluorinated polymer in the solution is advantageously comprised between 11% and 20% and preferably between 13% and 17% and very preferably between 13% and 15%. Furthermore, in most cases, the smaller the mass proportion of fluorinated polymer in the solution, the higher the rate of porosity in the film.

Furthermore, the fluorinated polymer can be a PVdF homopolymer or one of its derivatives, for example a copolymer obtained by copolymerization of the vinylidene fluoride with one or more other monomers, such as the copolymers PVdF/HFP, PVdF/CTFE, PVdF/TrFE, PVdF/TFE, PVdF/PTFE, PVdF/PCTFE, PVdF/ECTFE and so on.

After complete dissolution of the fluorinated polymer in the solvent, the solution is deposited on a support, by any type of deposition technique. The support can be of any kind. It can for example be formed by a metal substrate such as an aluminium film or an inert polymer film, by a glass plate or even by one of the electrodes of the lithium storage battery.

The support provided with the deposition is then placed in the presence of an atmosphere laden with water vapor in order to obtain precipitation of the fluorinated polymer by phase inversion. Precipitation of the fluorinated polymer by phase inversion is obtained within the scope of the invention by the sole operation of placing the support provided with the deposition in the presence of an atmosphere laden with water vapor, excluding any step of immersion in a liquid non-solvent bath (water for example). What is meant by atmosphere laden with water vapor is that the gaseous medium surrounding the deposition is laden with water vapor, i.e. that it presents a non-zero relative humidity content, advantageously comprised between about 60% and about 98% and even more advantageously between 85% and 98%. Furthermore, the temperature at which said precipitation step is performed, and more particularly the temperature of the surrounding gaseous medium, are advantageously comprised between 30° C. and 70° C.

For example purposes, this precipitation step of the fluorinated polymer can be performed by placing the support provided with the deposition in an enclosure thermostatically regulated to a preset temperature and in which the atmosphere is laden with water vapor, in order to precipitate the fluorinated polymer onto the support in a controlled manner. Such an enclosure can more particularly be an oven with controlled moisture content.

The temperature at which the enclosure is thermostatically regulated during the precipitation operation is advantageously comprised between 30° C. and 70° C. and it is more advantageously about 40° C.

The relative humidity content during the precipitation operation, and in particular in the thermostatically regulated enclosure, is further advantageously comprised between 60% and 98% and in an even more advantageous manner between 85% and 98%. More particularly, the relative humidity content is controlled during the precipitation operation and more particularly regulated around a setpoint value, by continuous inlet of water vapor to said enclosure from a water tank.

The duration of this step is advantageously less than or equal to 1 hour. It is for example comprised between 1 minute and 60 minutes and preferably between 10 minutes and 60 minutes.

Thus, the preparation of the solution containing the dissolved fluorinated polymer in a solvent in contact with an atmosphere laden with water vapor, with the possibility of being able to control the relative humidity content, enables to obtain a complete and controlled precipitation of the polymer, in advantageous manner by phase inversion, without immersion in a liquid non-solvent, thereby enabling a controlled rate of porosity to be obtained in the obtained film. Precipitation of the polymer is in fact controlled by progressive and controlled incorporation of water in the solution containing the solvent and the fluorinated polymer. Furthermore, this progressive incorporation of water in said solution is itself controlled by the partial pressure of water vapor contained in the atmosphere in equilibrium with the solution containing the fluorinated polymer and the solvent. It is thus possible to limit the quantity of water introduced into the solution with respect to an immersion in a large quantity of liquid water, which enables a slower precipitation of the polymer to be obtained thereby preventing the formation of skin (non-porous area at the surface of the membrane).

The fluorinated polymer film can then undergo a step of elimination of any residual trace of solvent and of water in said film. It is advantageously performed by vacuum drying. The vacuum drying step is advantageously performed at a temperature comprised between about 40° C. and about 80° C. and preferably of about 60° C. Such an elimination step cannot, within the scope of the invention, be performed by immersion in a liquid bath such as water, as this could be detrimental to subsequent use of the film as separator for a lithium storage battery.

Production of the film therefore excludes an immersion step in a liquid non-solvent and more particularly in liquid water, whether it is before or after the preparation of the solution containing the solvent in which the fluorinated polymer is dissolved in the presence of the atmosphere laden with water vapor.

Such a method for producing the film is moreover inexpensive, easy to implement and non-pollutant. It above all enables to obtain a homogeneous film presenting suitable properties for use as separator for a lithium storage battery.

The film obtained by means of such a production method is in fact symmetric, unlike a film obtained by phase inversion by immersion with water used as liquid non-solvent, as described in particular in the article "Fine structure of Poly(vinylidene fluoride) membranes prepared by phase inversion from a water/N-Methyl-2-pyrollidone/Poly(vinylidene fluoride) system" by D-J. Lin.

What is meant by symmetric film (or membrane) is a film having a substantially constant pore density and pore size over the whole thickness of the film. In particular, the opposing surfaces of the film present equivalent or substantially equal pore densities and pore sizes. The dissymmetry of a film does in fact in most cases give rise to the presence of a skin (non-porous surface) or of micropores. These two phenomena are however detrimental to correct operation of a lithium storage battery in so far as the former generates a high internal resistance and the latter enables short-circuits.

The film is further self-supported and macroporous. The mean size of the pores of said film is preferably comprised between about 0.5 µm and about 10 µm and even more preferably comprised between 0.5 µm and 4 µm.

Finally, the thickness of said film is advantageously comprised between 10 µm and 100 µm and preferably between 20 µm and 50 µm. This thickness of film is moreover adjustable if the deposition of the solution on the support is performed by means of a film applicator with an adjustable slot height.

The rate of porosity of the film is, more particularly, comprised between 35% and 95% and advantageously between 60% and 80%. It is furthermore advantageously substantially constant over the whole thickness of the film. The rate of porosity also called porosity ($\epsilon_p$) is in particular defined as the ratio between the difference between the theoretical density of the fluorinated polymer (noted $\rho_{theoretical}$ and of about 1.8 g·cm$^{-3}$ for PVdF) and the apparent density of the film ($\Sigma_{apparent}$) and the theoretical density of the fluorinated polymer: $\epsilon_p = (\rho_{theoretical} - \rho_{apparent})/\rho_{theoretical}$. Furthermore, the apparent density of the film is simply defined by the ratio of the mass of the film and its volume (surface×thickness).

According to a first example (hereinafter referred to as example no 1), a PVdF homopolymer film marketed by the Arkema Corporation under the name of Kynar®741 was produced by placing said homopolymer in solution in acetone. The mass proportion of polymer in the solution is 15%. Furthermore, the preparation of the solution is advantageously performed at a temperature of 60° C., in order to facilitate dissolution of the polymer in the solvent. The obtained solution is then poured onto an aluminium foil, and then placed in a thermostatically regulated oven, maintaining the temperature at 40° C. and with the relative humidity content maintained at 85%, for 60 minutes. The obtained film is then vacuum dried for 12 hours at a temperature of 60° C. in order to eliminate any traces of solvent or water.

Figure 2:
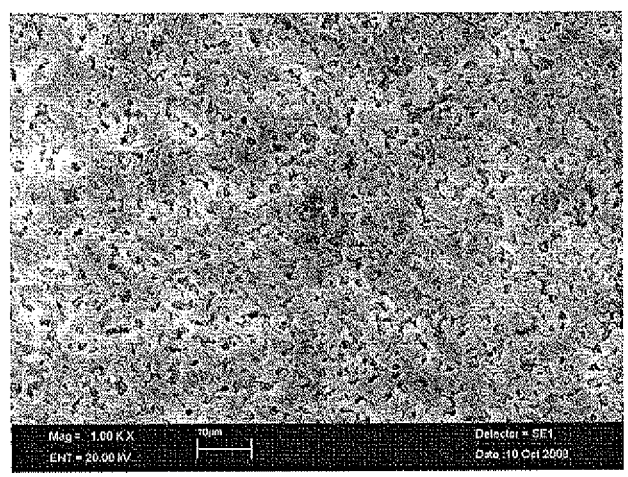
Figure 3:
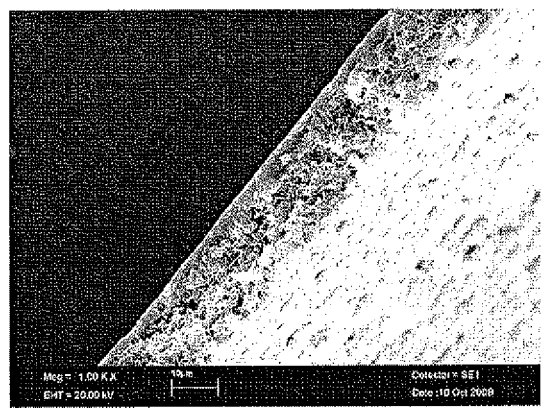

FIGS. 1 to 3 represent the snapshots obtained by scanning electron microscopy of the film obtained according to example no 1, respectively in front view, rear view and cross-section. Such a film presents a thickness of 75 µm, the size of the pores is comprised between 2 µm and 4 µm and the rate of porosity is 80%.

Three other PVdF homopolymer films (Kynar®741) were produced under similar conditions to the first example as reported in the table below (Examples no 2 to 4), but with the relative humidity content in the thermostatically regulated enclosure and/or the solvent used to dissolve the PVdF being varied.

According to a second example (hereinafter referred to as example no 5), a PVdF homopolymer film marketed by the Arkema Corporation under the name of Kynar®741 was produced by placing said homopolymer in solution in butanone. The mass proportion of polymer in the solution is 15%. Furthermore, the preparation of the solution is advantageously performed at a temperature of 70° C., in order to facilitate dissolution of the polymer in the solvent. The obtained solution is then poured onto an aluminium foil, and then placed in a thermostatically regulated oven, maintaining the temperature at 40° C. and with the relative humidity content maintained at 85%, for 40 minutes. The obtained film is then vacuum dried for 12 hours at a temperature of 60° C. in order to eliminate any trace of solvent. Such a film presents a thickness of 60 µm and, as reported in the table below, the size of the pores is comprised between 2 µm and 3 µm and the rate of porosity is 60%.

Two other PVdF homopolymer films (Kynar®741) were produced under similar conditions to the second example as reported in the table below (Examples no 6 and 7), but with a relative humidity content being made to vary in the thermostatically regulated enclosure.

According to a third example (hereinafter referred to as example no 8), a PVdF homopolymer film marketed by the Arkema Corporation under the name of Kynar®741 was produced by placing said homopolymer in solution in Cyclopentanone. The mass proportion of polymer in the solution is 15%. Furthermore, the preparation of the solution is advantageously performed at a temperature of 70° C., in order to facilitate dissolution of the polymer in the solvent. The obtained solution is then poured onto an aluminium foil, and then placed in a thermostatically regulated oven, maintaining the temperature at 40° C. and with the relative humidity content at a level of 95%, for 40 minutes. The obtained film is then vacuum dried for 12 hours at a temperature of 60° C. in order to eliminate any trace of solvent. Such a film presents a thickness of 65 µm and, as reported in the table below, the size of the pores is comprised between 0.7 and 1 µm and the rate of porosity is 65%.

TABLE

| Examples | Mass proportion of polymer in the solution (in %) | Solvent used to dissolve the polymer | Relative humidity content (in %) | Rate of porosity (%) | Pore size (μm) |
|---|---|---|---|---|---|
| 1 | 15 | Acetone | 85 | 80 | 2-4 μm |
| 2 | 15 | Acetone | 98 | 87 | 0.8-1 μm |
| 3 | 15 | Acetone | 95 | 76 | 3-4 μm |
| 4 | 13 | Acetone | 95 | 88 | 1-2.5 μm |
| 5 | 15 | Butanone | 85 | 60 | 2-3 μm |
| 6 | 15 | Butanone | 95 | 75 | 1.5-2 μm |
| 7 | 13 | Butanone | 95 | 84 | 1-2 μm |
| 8 | 15 | Cyclopentanone | 95 | 65 | 0.7-1 μm |

Furthermore, the films produced according to examples 1 to 8 all have the property of being symmetric films.

They can be used as separator for a lithium storage battery, arranged between negative and positive electrodes and imbibed with an advantageously non-aqueous, liquid electrolyte. The materials liable to form the positive and negative electrodes and the electrolyte of the lithium storage battery can be of any known type.

For example purposes, lithium storage batteries of button cell format were manufactured with each of the films produced according to examples 1 to 4 and with two commercial separators sold under the brand name of C480® (PP/PE/PP three-layer with a thickness of 21.5 μm) and C2400® (PP single-layer with a thickness of 25 μm) marketed by Celgard.

Each lithium storage battery comprises:
- a negative electrode formed by a disk with a diameter of 16 mm taken from a composite film with a thickness of 25 μm (about 1.5 mAh·cm$^{-2}$) formed by a mixture of $Li_4Ti_5O_{12}$ (82% mass), of carbon (12% mass) and of PVdF (6% mass) as binder, the disk being deposited on a current collector formed by an aluminium foil with a thickness of 20 μm,
- a positive electrode formed by a disk with a diameter of 14 mm taken from a composite film with a thickness of 25 μm formed by a mixture of $LiFePO_4$ (82% mass), of carbon (12% mass) and PVdF (6% mass) as binder, the disk being deposited on a current collector formed by an aluminium foil with a thickness of 20 μm,
- a separator according to examples 1 to 4, C480 or C2400, imbibed with a liquid electrolyte having a $LiPF_6$ salt base (1 mol·L$^{-1}$) in solution in a mixture of ethylene carbonate and dimethyl carbonate.

Figure 4:
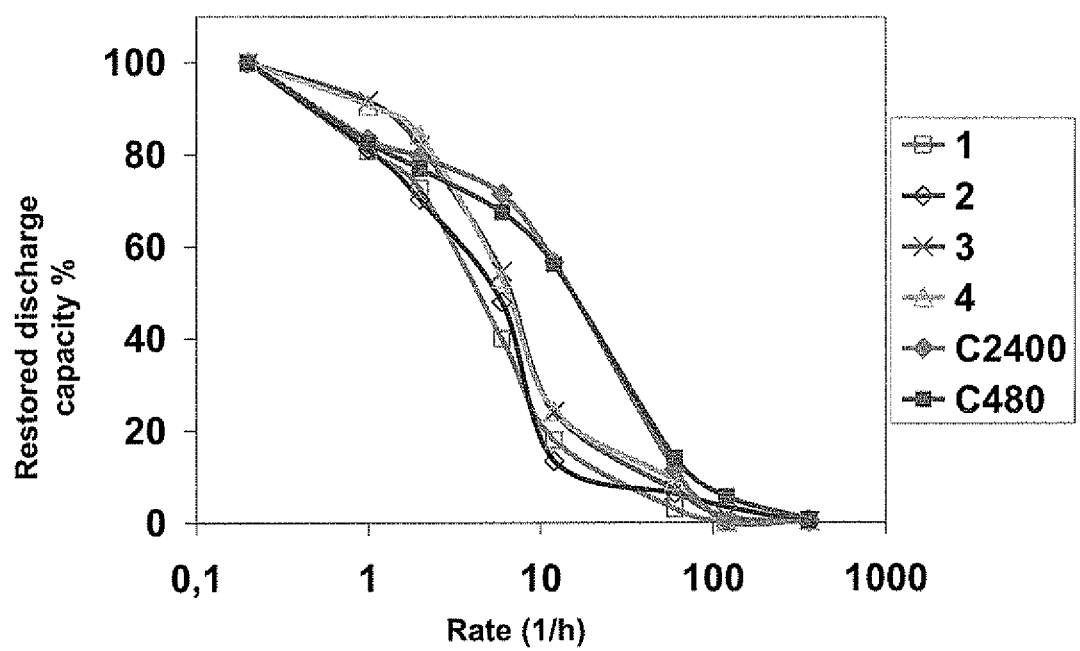
FIG. 4 is a graph representing the variation of the percentage of capacity restored on discharge versus the rate, for lithium storage batteries comprising different separator elements.

These different storage batteries were tested between 0.05V and 2.8V at ambient temperature in galvanostatic mode with the following protocol:
- a charge and discharge cycle at C/5 rate
- a charge at C/5 rate followed by a discharge at 360 C rate
- a charge at C/5 rate followed by a discharge at 120 C rate
- a charge at C/5 rate followed by a discharge at 60 C rate
- a charge at C/5 rate followed by a discharge at 12 C rate
- a charge at C/5 rate followed by a discharge at 6 C rate
- a charge at C/5 rate followed by a discharge at 2 C rate
- a charge at C/5 rate followed by a discharge at C rate
- a charge at C/5 rate followed by a discharge at C/5 rate FIG. 4 then illustrates the percentage of charge restored on discharge versus the rate for the different storage batteries tested with the membranes of examples 1 to 4 obtained according to the method of the invention and with the commercial membranes C2400® and C480® marketed by Celgard.

The invention claimed is:

1. A method of forming a separator for a lithium storage battery, the separator comprising a fluorinated polymer film of polyvinylidene fluoride, the method consisting of the following steps:
   depositing on a support a solution containing a solvent in which a fluorinated polymer is dissolved; and
   precipitating the fluorinated polymer by phase inversion with water by placing said solution in the presence of an atmosphere laden with water vapor,
   thereby forming the separator comprising the fluorinated polymer film of polyvinylidene fluoride,
   wherein:
   the method does not comprise an immersion step in a liquid non-solvent; and
   the mass proportion of fluorinated polymer in the solution is from 11% to 20%.

2. The method according to claim 1, wherein the precipitating step of the fluorinated polymer is performed at a temperature from 30° C. to 70° C.

3. The method according to claim 1, wherein the solvent is selected from the group consisting of acetone, butanone, N-methylpyrrolidone, tetrahydrofuran, dimethylsulfoxide, cyclopentanone, γ-butyrolactone, and mixtures thereof.

4. The method according to claim 1, wherein the mass proportion of fluorinated polymer in the solution is from 13% to 17%.

5. The method according to claim 1, wherein the precipitating step of the fluorinated polymer is carried out by placing the support on which the solution is deposited in an enclosure containing an atmosphere laden with water vapor.

6. The method according to claim 5, wherein the enclosure is thermostatically regulated at a temperature from 30° C. to 70° C. during precipitation of the fluorinated polymer.

7. The method according to claim 1, wherein the relative humidity content during precipitation of the fluorinated polymer is from 60% to 98%.

8. The method according to claim 7, wherein the relative humidity content during precipitation of the fluorinated polymer is from 85% to 98%.

9. The method according to claim 1, wherein the precipitation step of the fluorinated polymer is followed by a step of vacuum drying at a temperature from 40° C. to 80° C.

10. The method according to claim 1, wherein the duration of the precipitation step of the fluorinated polymer is from 1 minute to 60 minutes.

11. The method according to claim 1, wherein the support comprises an electrode for a lithium storage battery.

12. The method according to claim 1, wherein the solution is deposited on said support via a film applicator with an adjustable slot height.

13. The method according to claim 1, wherein the deposition has a thickness comprised between 10 μm and 100 μm.

14. The method according to claim 1, wherein the film has a rate of porosity from 35% to 95%.

15. The method according to claim 1, wherein the film has pores having a mean size from 0.5 μm to 10 μm.

16. The method according to claim 15, wherein the film presents pores having a mean size comprised between 0.5 μm and 4 μm.

17. A separator for a lithium storage battery formed by the method according to claim 1.

* * * * *